Figure 4:
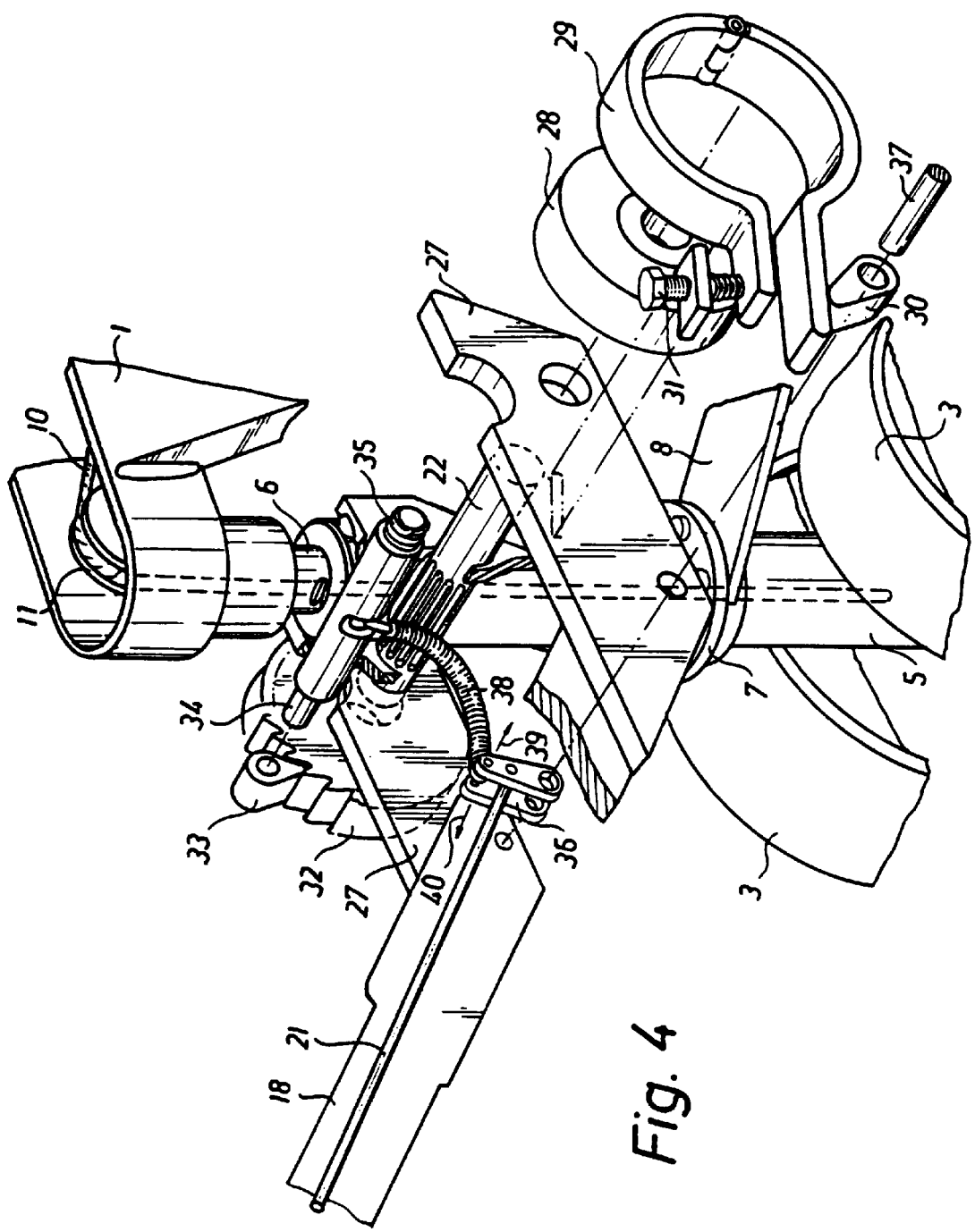

United States Patent
Johansson

[19]

[11] Patent Number: 5,951,234
[45] Date of Patent: Sep. 14, 1999

[54] PALLET LOADER

[75] Inventor: Evald Johansson, Homburgound, Sweden

[73] Assignee: Kentruck AB, Ed, Sweden

[21] Appl. No.: 08/952,150

[22] PCT Filed: May 7, 1996

[86] PCT No.: PCT/SE96/00592

§ 371 Date: Nov. 4, 1997

§ 102(e) Date: Nov. 4, 1997

[87] PCT Pub. No.: WO96/35603

PCT Pub. Date: Nov. 14, 1996

[30] Foreign Application Priority Data

May 8, 1995 [SE] Sweden ................................. 9501691

[51] Int. Cl.[6] .................................................. B66F 19/00
[52] U.S. Cl. .................. 414/495; 280/43.12; 280/43.21; 280/43.19; 188/250 R; 254/4 R; 254/6 R; 254/95
[58] Field of Search ..................................... 414/495, 498, 414/608, 785, 787; 280/43.21, 43.19, 43.12, 29; 188/250 R; 254/2 B, 2 C, 4 R, 6 R, 6 B, 6 C, 387, 95

[56] References Cited

U.S. PATENT DOCUMENTS

| | | | |
|---|---|---|---|
| 1,997,327 | 4/1935 | Warshaw | 280/46 |
| 2,372,585 | 3/1945 | Klumb et al. | 280/49 |
| 4,737,065 | 4/1988 | Ju | 414/490 |
| 4,997,175 | 3/1991 | Hashida et al. | 270/45 |
| 4,997,195 | 3/1991 | Lee | 414/495 X |
| 5,078,364 | 1/1992 | Harrell | 254/387 |
| 5,403,024 | 4/1995 | Frketic | 414/785 X |
| 5,516,128 | 5/1996 | Nakade et al. | 414/495 X |

FOREIGN PATENT DOCUMENTS

| | | | |
|---|---|---|---|
| 132113 | 12/1947 | Australia | 280/43.12 |
| 2 546 498 | 11/1984 | France. | |
| 453462 | 11/1927 | Germany. | |
| 850473 | 7/1981 | U.S.S.R. | 280/43.12 |

*Primary Examiner*—Frank E. Werner
*Attorney, Agent, or Firm*—Pillsbury Madison & Sutro LLP

[57] ABSTRACT

The invention concerns an improved device in pallet loaders, comprising an upright frame (1) and a pair of horizontal lifting fork members (2) which may be raised and lowered together with said frame (1) by means of a lifting mechanism. The lifting fork members (2) are equipped at their outermost end with one support wheel (4) each, which wheels are attached to an articulated arm (14) arranged to be pivoted downwards. The frame (1) and the lifting fork members (2) may be raised and lowered by means of a rack (6) which is connected via a cable, wire on chain (10) to an articulated, two-armed rocker arm (13). In turn, the latter is connected to the articulated arm (14) by means of a traction rod (15) which is associated with the arm (14). Upon upwards motion of the rack (6) and thus of the frame (1) a pulling force on the cable (10) will be transferred via the rocker arm (13) and the traction rod (15) to the articulated arm (14), which then swings downwards, thus raising the lifting fork members (2).

7 Claims, 3 Drawing Sheets

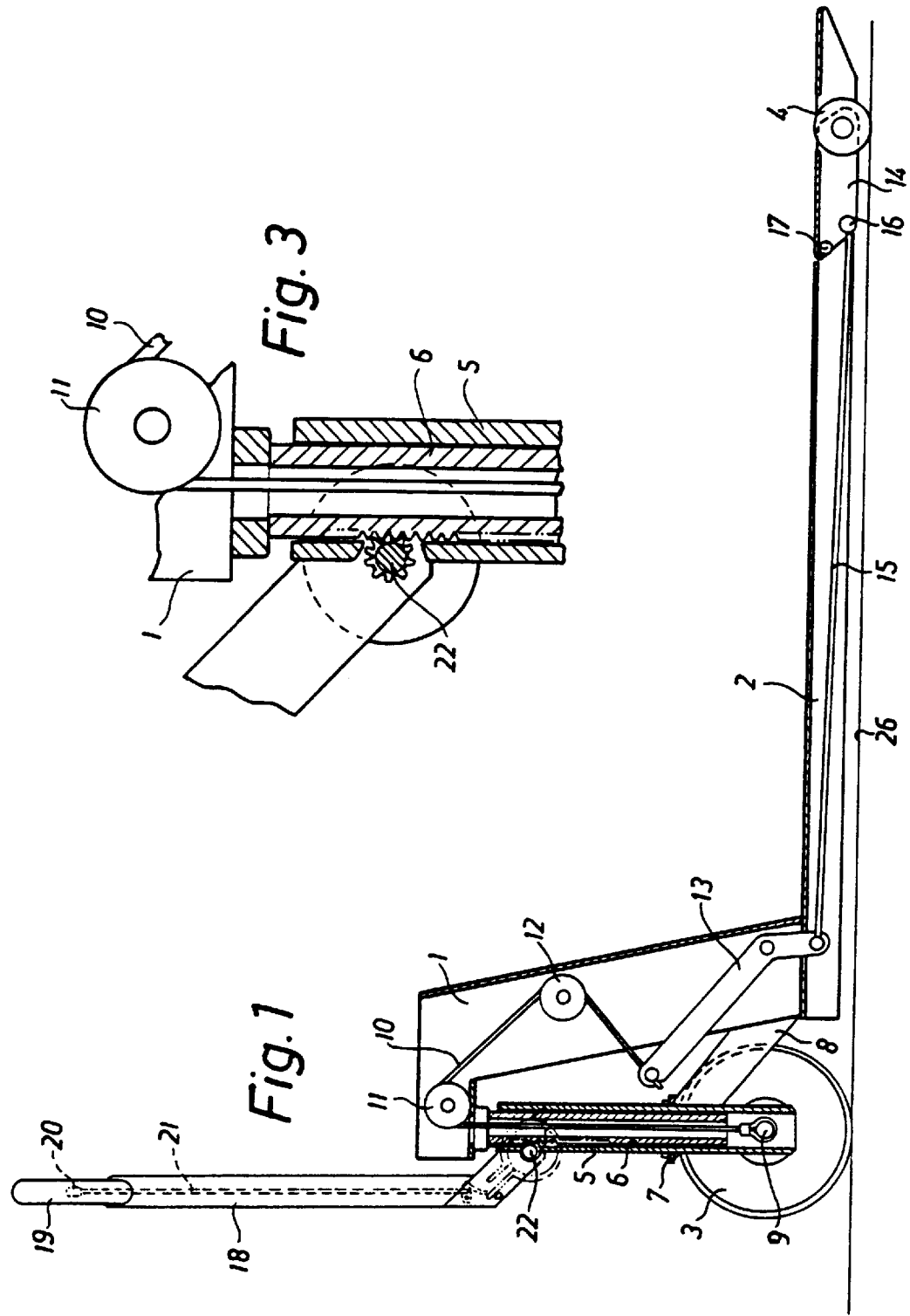

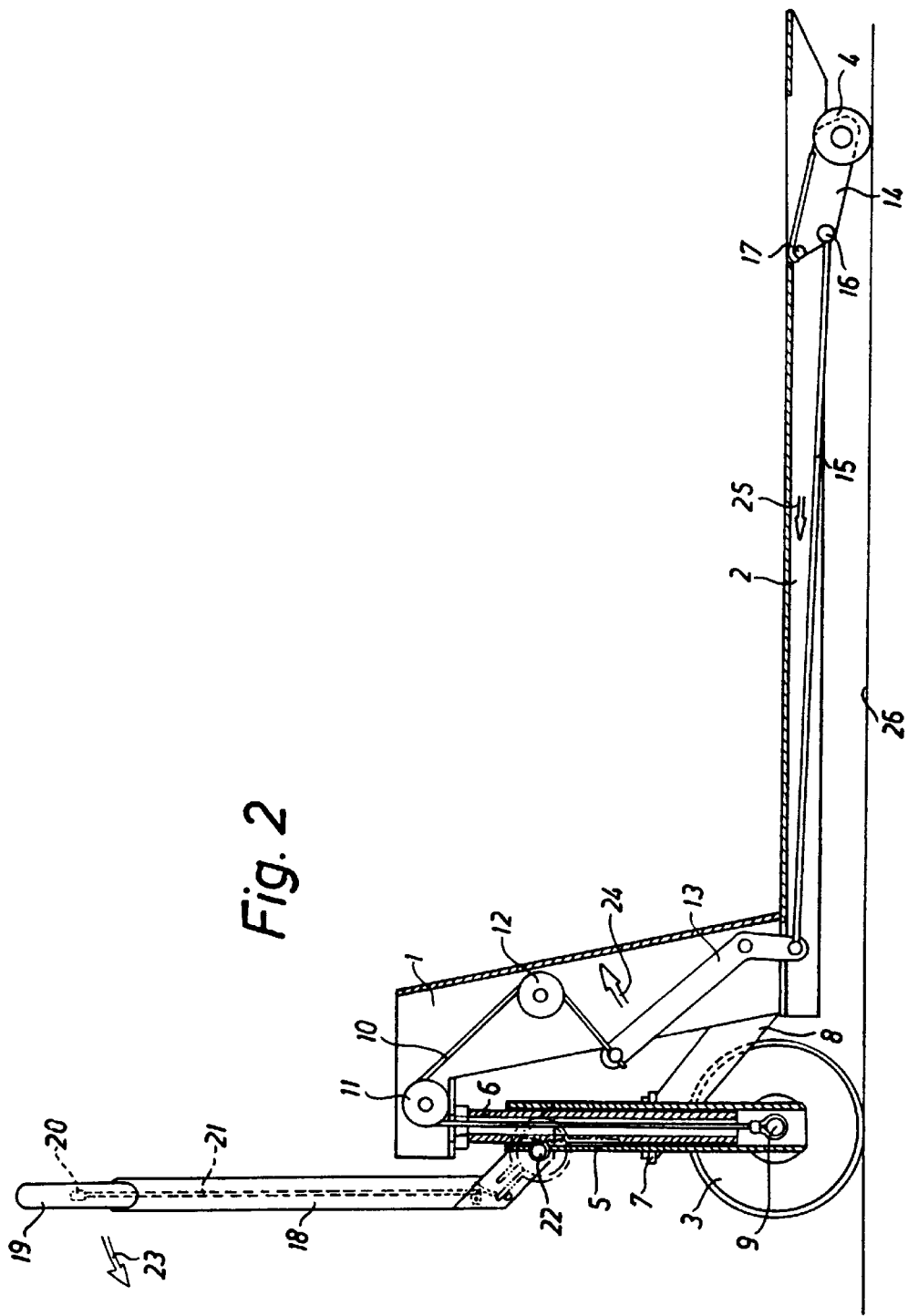

PALLET LOADER

This Application is a 371 of PCT/SE96/00592 (May 07, 1996)

The invention concerns an improved pallet loader comprising an upright frame and a pair of horizontal lifting fork members projecting from the frame and being vertically displaceable together with said frame by means of a hoisting mechanism incorporated in the pallet loader. Each fork member is equipped at its free end opposite the frame with a support wheel in contact with a supporting surface.

Pallet loaders of this kind designed to lift and transport pallet loads are generally equipped with an hydraulically operated hoisting mechanism. This kind of mechanism is a versatile construction that is easy to manipulate, also when the loads are comparatively heavy.

The construction does, however, suffer from certain drawbacks. For instance, it is difficult to maintain its valves and couplings in a completely sealed condition for any length of time. Consequently, oil leakages occur from time to time, which is a considerable nuisance, particularly when the pallet loader is used in a "tidy" environment, for instance when driven on sensitive surfaces, such as wall-to-wall carpets and the like. In order to reduce the risk of soiling of or even damage to the supporting surface oil leakages may be prevented by ensuring frequent servicing of the pallet loader lifting mechanism hydraulics. As always, extensive servicing does, however, involve not insignificant expenses.

The subject invention suggests a purely mechanical lifting mechanism for use in pallet loaders, by means of which the problem outlined above is entirely eliminated while at the same time it provides an improved gear ratio for a given size of pallet loader than the hydraulic lifting mechanism, allowing the goods to be handled quicker and more efficiently. The characterizing features of the device in accordance with the invention will appear from the appended claims.

The invention will be described in closer detail in the following with reference to the accompanying drawings, wherein FIG. 1 is a vertical sectional view through a pallet loader in accordance with the invention, the loader being shown in a lower position, FIG. 2 is a similar view but showing the pallet loader in a lifted position, FIG. 3 is a vertical sectional view on a larger scale of a part of the lifting mechanism, and FIG. 4 shows the lifting mechanism in a perspective exploded view and on a larger scale.

The pallet loader consists of an upstanding frame portion 1 and a pair of horizontal lifting fork members 2 projecting from the frame. At its rear, the pallet loader is provided with a couple of larger support and steering wheels 3 and at its front, at the forward ends of the fork members, with a pair of smaller support wheels 4.

Intermediate the rear support and steering wheels 3 a vertical hollow cylinder 5 is mounted. Inside the latter, a rack 6 is arranged to be raised and lowered, and the frame portion 1 is supported against the upper end of the rack which projects past the cylinder 5. A couple of transverse stays 8 extend between the frame portion 1 and a locating bearing 7 surrounding the hollow cylinder 5.

In the version illustrated in the drawing figures, the rack 6 is configured as a pipe. From a lower point of attachment 9, below the rack 6, a cable, wire, chain 10 or the like extends through the rack to one end of a two-armed rocker arm 13, via a first pulley 11 and a second pulley 12. A traction rod 15 extends between the opposite end of the rocker arm 13 and an articulated arm 14 on which the support wheel 4 is mounted. The traction rod 15 is connected to the articulated arm 14 in a pivot 16 which is spaced somewhat from the pivot pin 17 on which the articulated arm 14 is pivotally mounted, in order to create a moment when a pulling force is exerted on the traction rod 15.

In addition, the pallet loader is provided with a lever 18 and with an operating handle 19 with a manually operated control means 20 thereon, by means of which the lifting mechanism may be actuated with the aid of an operating rod 21 extending through the lever 18. This arrangement will be described in closer detail in the following. The lever 18 is connected with a rod-shaped pinion 22 which engages the rack 6.

The lifting mechanism operates in the following manner. When the lever 18 is swung downwards in the direction indicated by arrow 23, see FIG. 2, the rod-shaped pinion 22 drives the rack 6 somewhat upwards, out of the cylinder 5, thus forcing the frame portion 1 and the lifting fork members 2 to take part in this upwards movement. Because the pulleys 11 and 12 move together with the frame portion 1, a pulling force is exerted on the wire 10, etcetera, urging the rocker arm 13 to rock in the direction of arrow 24. A pulling force is then generated, acting on the traction rod 15 in the direction of arrow 25, with the result that the articulated arm 14 pivots downwards, in consequence whereof the support wheel 4 will abut against the supporting surface 26 on which the pallet loader rests. Because of the lifting movement described, the forwards ends of the lifting fork members will take part in the lifting movement of the rest of the pallet loader.

With reference to FIG. 4 the function of the lifting mechanism will be described in closer detail. The lever 18 is provided with a couple of angle plates 27, by means of which the lever 18 is freely rotatable about the rod-shaped pinion 22. At the adjacent end of the rod pinion 22, as seen in the drawing, a free wheel 28, around which a brake lining 29 is passed, is securely attached. The brake lining 29 is attached to the angle plate 27 so as to follow the pivotal movement thereof. By means of an eccentric element 30 the brake lining 29 is tightened about the free wheel. A set screw 31 is provided to adjust the tightening force of the brake lining 29.

The free wheel 28 operates in the following manner. When the lever 18 is swung downwards, its pivotal movement is transferred via the angle plate 27, the friction lining 29 and the free wheel 28 which then urges the pinion 22 to turn anti-clockwise as seen in FIG. 4, forcing the ratchet 6 to move upwards, out of the hollow cylinder 5. Upon return movement of the lever 18 the free wheel 28 runs freely on the pinion 22.

The opposite end of the rod-shaped pinion 22 supports a ratchet wheel 32 securely attached thereto and in engagement with a wedge-shaped catch 33, the latter being mounted on a rotational shaft 34 which is biased by a spring 35 to turn the catch wedge 33 to its blocking position, engaging the ratchet wheel 32. As the lever 18 performs its return movement mentioned above, the ratchet wheel 32 thus will prevent the rod-shaped pinion 22 from taking part in this movement and again lower the ratchet 6.

By means of the operating rod 21 the manually operated control means 20 is connected to a link 36 which is mounted on the same pivot shaft 37 as the eccentric element means 30. In addition, via flexible interconnection means 38 the link 36 is attached to the rotational shaft 34.

The manual control 20 allows the mechanism to be set in three different positions, viz. a lower position when the link 36 is displaced in the direction of arrow 39, a middle position illustrated in the drawing, and an upper position when the link 36 is displaced in the direction of arrow 40. In the lower position, the eccentric element 30 has been turned inwards, to a braking position in engagement with the brake lining 29. In this position, the lifting mechanism is effective to raise the lifting fork members 2. Every time the lever 18 is pulled downwards, the ratchet wheel 32 thus moves past the wedge-shaped catch 33 and upon each return movement of the lever 18, the wedge-shaped catch 33 moves into a blocking position while at the same time the braking device and the free wheel 28 travel freely above the rod-shaped pinion 22 and thus follow the angle plate 27 in its return movement.

When the link 36 is moved to the middle position, the interconnection means 38 is slightly stretched. When the operating handle 19 and the lever 18 are pulled downwards, the interconnection means 38 will be stretched, releasing the catch 33 from its engaged blocking position. However, the eccentric element 30 has been moved over a short distance only, for which reason the brake mechanism still is tightened. By means of pulling the manual control 20 in this situation and thus moving the link 36 in the direction towards the upper position, i.e. in the direction of arrow 40, the braking mechanism may be released successively, making the lifting fork members 2 to be lowered towards the support 26 at a slower or quicker pace.

By the provision of a bent, flexible interconnection means 38 a fourth set position of the lifting mechanism becomes possible. For when the manual control means 20 is pulled without the lever 18 also being swung downwards, the eccentric element 30 will be turned away from its locking position but the interconnection means 38 will only be straightened and thus not disengage the wedge-shaped catch 33. In this position, the lever 18 will be freely movable, which facilitates actuation and advancement of the pallet loader.

The invention is not limited to the embodiment described and illustrated but could be varied in several ways within the scope of the appended claims. Instead of the ratchet wheel 32, for instance, a free wheel could be placed also at this side, acting in the opposite direction to free wheel 28 and being formed with only one or possibly a few recesses in which the wedge catch 33 may engage for locking purposes. This solution eliminates the rattling noise created by the wedge catch 33 as it runs over the teeth of the ratchet wheel 32.

I claim:

1. An improved device in pallet loaders, comprising an upright frame (1), and a pair of horizontal lifting fork members (2) projecting from the frame (1) and being vertically displaceable together with said frame (1) by means of a hoisting mechanism incorporated in said device, each fork member (2) equipped at its free end opposite the frame (1) with a support wheel (4) in contact with a supporting surface (26) and mounted on an articulated arm (14) which is hingedly mounted on a pivot pin (17) on the lifting fork members (2), whereby said arm (14) may be pivoted downwards away from said members (2) to increase the distance of said members (2) to the supporting surface (26), the hoisting mechanism comprising a rack (6) which is arranged to be raised and lowered inside a vertical hollow cylinder (5) and which is connected to the frame (1) in such a manner as to make the latter and the lifting fork members (2) take part in its upwards and downwards movements, and a two-armed rocker arm (13) which is pivotally connected to the frame (1) and one end of which is attached to the articulated arm (14) by means of a rod (15), the latter being connected to the articulated arm (14) in a pivot (16) spaced from the pivot pin (17), characterized in that the rod (15) is a traction rod and that the rocker arm (13) at the end opposite the rod (15) is connected to a line (10) extending, via a pair of pulleys (11, 12) mounted on the frame (1), through the rack (6) to a point (9) of attachment, and in that the rack (6) is arranged, when moving upwards, to lift the frame (1) while at the same time bringing the line (10) to rock the rocker arm (13), the latter, in turn arranged, when rocked, by means of traction to urge the rod (15) to pivot the articulated arm (14) downwards and thus to lift the lifting fork members (2) off the supporting surface (26).

2. A device as claimed in claim 1, whereby the rack (6) is vertically displaceable by means of a rotatable rod-shaped pinion (22) which engages the rack (6) characterized in that a lever (18) is mounted on the rod-shaped pinion (22) for free pivotable movement thereon, on which lever (18)a braking mechanism (29, 30, 31) is secured so as to follow the movements of the lever (18), and in that one end of the rod-shaped pinion (22) supports a free wheel (28) cooperating with the pinion (22) and the braking mechanism (29, 30, 31) in such a manner that the braking mechanism (29, 30, 31), when applied and upon a lever movement to lift the lifting fork members (2), forces the free wheel (28) to rotate the pinion (22) to lift the ratchet (6), whereas a lever movement in the opposite direction is not transferred to the rod-shaped pinion (22), and in that on the opposite end of the pinion (22) is securely mounted a ratchet wheel (32), in which may engage a wedge-shaped catch (33) arranged to prevent rotational movement of the rod-shaped pinion (22) in the said opposite direction.

3. A device as claimed in claim 1, characterized in that a manual control means (20) for resetting the hoisting mechanism is coupled to a link (36) which is arranged via a manual control means (20) to turn a shaft (37), on which is securely mounted a means (30) for the application and the release of a braking mechanism (29, 30, 31).

4. A device as claimed in claim 3, characterized in that the braking mechanism consists of a lining (29) applied about the free wheel (28), and in that the means for the application and the release of the braking mechanism consists of an eccentric element (30) in abutment against an end portion of the brake lining (29) and arranged for turning movement on the shaft (37) in a direction towards and outwardly away from said end portion.

5. A device as claimed in claim 4, characterized in that a set screw (31) arranged to regulate the force of application of the brake lining (29) against the free wheel (28) by means of the eccentric element (30) abuts against the opposite end portion of the brake lining (29).

6. A device as claimed in claim 1, characterized in that a wedge-shaped catch (33) is securely mounted on a rotary shaft (34) which is connected to a link (36), and may be pivoted from its engaged blocking position against the action of a spring means (35) as a result of a manual control means (20) displacing said link (36).

7. A device as claimed in claim 6, characterized in that the link (36) is connected to the rotary shaft (34) by means of a flexible, elastic interconnection means (38).

* * * * *